United States Patent [19]
Berton et al.

[11] Patent Number: 5,129,658
[45] Date of Patent: Jul. 14, 1992

[54] SEAL FOR AN INTERNAL COMBUSTION ENGINE INJECTOR

[75] Inventors: Jean-Luc Berton, Saint-Geosmes; Georges Hammann, Thivet, both of France

[73] Assignee: Procal, Langres, France

[21] Appl. No.: 659,953

[22] Filed: Feb. 25, 1991

[30] Foreign Application Priority Data

Mar. 2, 1990 [FR] France ............... 90 02671

[51] Int. Cl.⁵ ............... F16J 15/02; F02M 61/16
[52] U.S. Cl. .................. 277/37; 277/152; 277/166; 277/178; 277/183; 277/186; 239/533.11; 123/470
[58] Field of Search ............ 277/37, 152, 166, 178, 277/181, 183, 186; 239/533.2, 533.3, 533.4, 533.11, 585; 123/470, 471

[56] References Cited

U.S. PATENT DOCUMENTS

| | | | |
|---|---|---|---|
| 2,729,482 | 1/1956 | Kosatka | 277/178 |
| 4,296,887 | 10/1981 | Hofmann | 239/533.2 X |
| 4,669,737 | 6/1987 | Diffenderfer | 277/152 X |

FOREIGN PATENT DOCUMENTS

| | | | |
|---|---|---|---|
| 2208646 | 8/1973 | Fed. Rep. of Germany | 123/470 |
| 2824476 | 12/1979 | Fed. Rep. of Germany | . |
| 3503602 | 4/1986 | Fed. Rep. of Germany | 277/152 |
| 1053609 | 2/1954 | France | 239/533.1-1 |
| 2022727 | 12/1979 | United Kingdom | . |

OTHER PUBLICATIONS

French Search Report of 30 Nov. 1990.

*Primary Examiner*—Allan N. Shoap
*Assistant Examiner*—James K. Folker
*Attorney, Agent, or Firm*—Hoffman, Wasson & Gitler

[57] ABSTRACT

This invention relates to a seal for an internal combustion engine injector, of the type intended to produce a seal between the outside wall of the injector or of an injector support facing the wall of the housing provided for the injector in the cylinder head of the engine.

The seal comprises a cylindrical reinforcement (4), of approximately L-shaped section, whose short leg (6) defines an annular bearing surface for resting against an end bearing surface (14) of the injector or of the injector support (3), and on whose long leg (5) an elastomer packing (7) is made to adhere that has an annular inside sealing bearing surface (8) able to assure a sealing contact with the peripheral surface of the injector or the injector support, and at least one sealing lip (9) projecting outward, preferably near the free end of the long leg of the reinforcement, able to assure a sealing contact with the cylindrical wall of housing (2) of the injector in cylinder head (1).

4 Claims, 1 Drawing Sheet

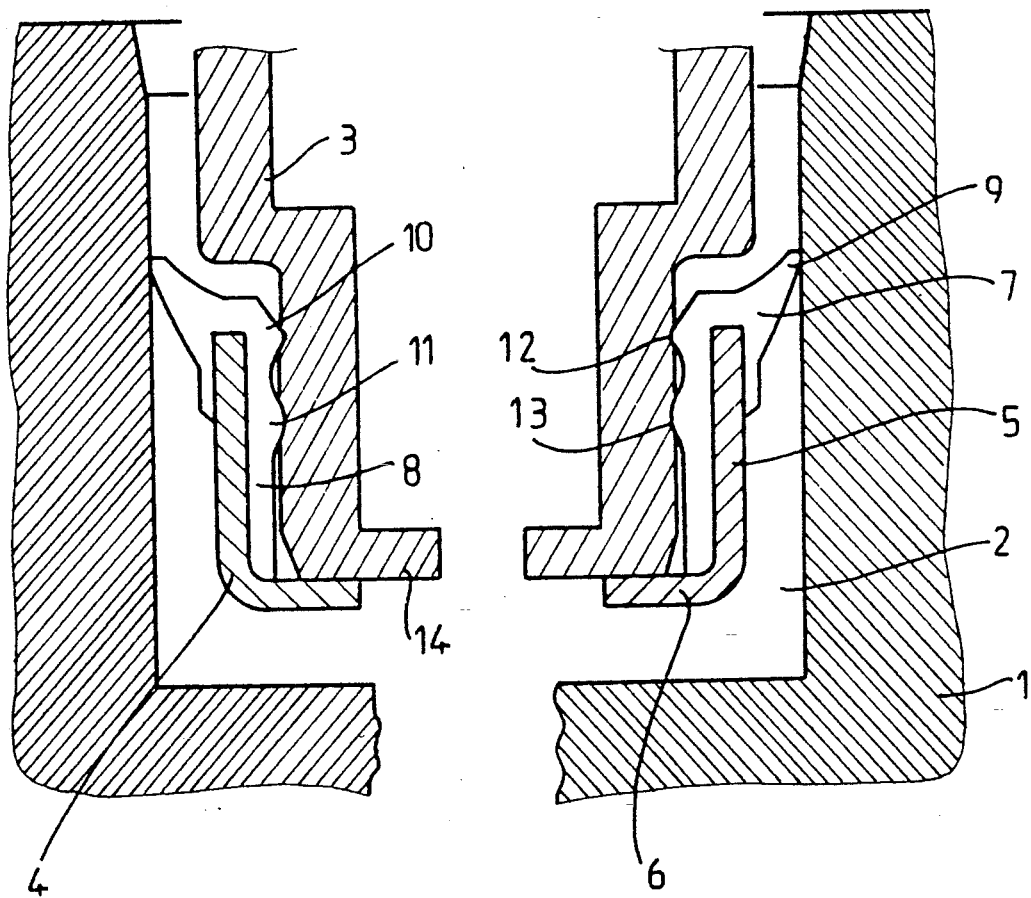

SEAL FOR AN INTERNAL COMBUSTION ENGINE INJECTOR

This invention relates to a seal for an internal combustion engine injector, of the type intended to produce a seal between the outside wall of the injector or of an injector support and the wall of the housing provided for the injector in the cylinder head of the engine.

This seal is achieved in a standard way by positioning in a peripheral groove of the injector a static seal, particularly an O-ring, that comes in contact with the wall of the cylindrical housing of the cylinder head in which the injector must be housed.

As a result of the "blind" positioning of the injector in its housing in the cylinder head, an axial displacement can occur of the O-ring in relation to its retaining groove in the injector or its support as a result of friction on the wall of the housing of the cylinder head, so that it is never assured that the seal is correctly in place in the use position of the injector, a defect in positioning of the seal causing sealing defects around the injector.

This invention is proposed to produce a seal for an internal combustion engine injector, of particularly simple and economical design, that avoids this drawback in particular. The seal according to the invention can further, depending on the case, be positioned directly on an injector or, when the design of the engine provides for it, on an injector support housed in the cylinder head.

The seal according to the invention is of the lip ring type and comprises a cylindrical reinforcement of approximately L-shaped section, whose short leg defines an annular bearing surface for resting against an end bearing surface of the injector or of the injector support, and on whose long leg an elastomer packing is made to adhere that has an annular inside sealing bearing surface able to assure a sealing contact with the peripheral surface of the injector or the injector support, and at least one sealing lip projecting outward, preferably near the free end of the long leg of the reinforcement, able to assure a sealing contact with the cylindrical wall of the housing of the injector in the cylinder head.

Preferably, the inside bearing surface of the packing and the outside wall of the injector or of the injector support comprise locking means that cooperate to immobilize the seal axially on the injector or the injector support.

Advantageously, the inside bearing surface of the packing thus comprises at least one annular flange that projects inward and is able to be housed in a peripheral groove made in the outside wall of the injector or the injector support.

In a particularly embodiment, two annular flanges are provided that are axially spaced and able to be housed in peripheral annular grooves that are axially spaced on the outside wall of the injector or the injector support.

To understand the invention better, an embodiment will now be described by way of example that is in no way limiting by referring to the accompanying drawing in which:

the single figure is a diagrammatic view in section of a seal according to the invention mounted on an injector support.

Illustrated diagrammatically in FIG. 1 is a portion of a cylinder head 1 of an internal combustion engine defining a cylindrical housing 2 in which a support 3 that is intended to receive an injector (not shown) is positioned.

The seal according to the invention comprises a metal reinforcement 4 that exhibits approximately an L-shaped section with a long leg 5 extended by a short leg 6.

On reinforcement 4 is made to adhere an elastomer packing designated overall by 7 and that has an annular inside bearing surface 8 and a sealing lip 9 projecting outward beyond the free end of long leg 5 of reinforcement 4.

Inside bearing surface 8 of the packing has two annular flanges 10, 11, axially spaced and being engaged as is seen in the drawing in peripheral grooves 12, and 13, respectively, made in the outside wall of injector support 3.

As is taken into account on examination of the drawing, the seal is perfectly positioned axially in relation to injector support 3 by resting of short leg 6 of the reinforcement against the end face 14 of the injector support, any relative axial displacement of the seal and of the injector support being prevented by engagement of flanges 10 and 11 of the packing in corresponding grooves 12, 13 of the injector support.

The seal according to the invention is very easily positioned on an injector support (or on an injector) by fitting on its end, then the injector support (or injector) is positioned in its housing 2 of the cylinder head, the seal being perfectly held on the injector support (or on the injector) both during the positioning phase and during use.

Although the invention has been described in connection with a particular embodiment, it is quite obvious that it is in no way limited to it and that it is possible to bring different variants and modifications to it without thereby going outside its scope or its spirit.

We claim:

1. A seal for an internal combustion engine injector, of the type intended to produce a seal between an outside wall of the injector or of an injector support and a cylindrical housing wall provided for the injector in a cylinder head of the engine, comprising a cylindrical reinforcement (4) having a short leg (6) and a long leg (5), forming an approximately L-shaped section, wherein said short leg (6) defines an annular bearing surface for resting against an end bearing surface (14) of the injector or of the injector support (3), and an elastomer packing (7) is adhered to said long leg (5) such that said elastomer packing has an annular inside sealing bearing surface (8) assuring a sealing contact with a peripheral surface of the injector or the injector support, and at least one sealing lip (9) projecting outward, assuring a sealing contact with the cylindrical housing wall of the injector in said cylinder head (1).

2. Seal for an internal combustion engine injector according to claim 1, wherein inside bearing surface (8) of packing (7) and the outside wall of the injector or of the injector support (3) has locking means (10, 11; 12, 13) that cooperate to immobilize the seal axially on the injector or injector support.

3. Seal for an internal combustion engine injector according to claim 2, wherein inside bearing surface (8) of the packing has at least one annular flange (lo, 11) projecting inward and housed in a peripheral groove (12, 13) made in the outside wall of the injector or injector support.

4. Seal for an internal combustion engine injector according to claim 3, wherein it comprises two annular flanges (10, 11) that are axially spaced and housed in peripheral annular grooves (12, 13) that are spaced axially on the outside wall of the injector or injector support.

* * * * *